United States Patent
Morton et al.

(10) Patent No.: US 12,352,287 B1
(45) Date of Patent: *Jul. 8, 2025

(54) VARIABLE GUIDE VANE FOR AIRCRAFT PROPULSION SYSTEM

(71) Applicant: RTX Corporation, Farmington, CT (US)

(72) Inventors: Jeffrey T. Morton, Manchester, CT (US); Stephen G. Pixton, South Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,610

(22) Filed: Mar. 25, 2024

(51) Int. Cl.
  *F04D 29/54* (2006.01)
  *F01D 5/14* (2006.01)
  *F01D 17/16* (2006.01)

(52) U.S. Cl.
  CPC ........... *F04D 29/541* (2013.01); *F01D 5/141* (2013.01); *F01D 5/148* (2013.01); *F01D 17/162* (2013.01); *F05D 2220/323* (2013.01)

(58) Field of Classification Search
  CPC ........ F04D 29/541; F01D 5/141; F01D 5/148; F01D 17/162; F05D 2220/323
  See application file for complete search history.

(56) References Cited

U.S. PATENT DOCUMENTS

| | | | | |
|---|---|---|---|---|
| 3,237,918 A | * | 3/1966 | Le Bell | F01D 17/162 415/161 |
| 3,295,827 A | * | 1/1967 | Chapman | F01D 17/162 415/161 |
| 3,946,554 A | * | 3/1976 | Neumann | F04D 27/0246 415/162 |
| 4,497,171 A | * | 2/1985 | Corrigan | F01D 17/167 415/151 |
| 4,705,452 A | * | 11/1987 | Karadimas | F01D 17/162 415/161 |
| 4,995,786 A | | 2/1991 | Wheeler | |

(Continued)

FOREIGN PATENT DOCUMENTS

| | | | | |
|---|---|---|---|---|
| DE | 10257044 B4 | | 1/2005 | |
| EP | 3441305 A1 | * | 2/2019 | ............. B64C 11/18 |

(Continued)

*Primary Examiner* — Brian Christopher Delrue
(74) *Attorney, Agent, or Firm* — Getz Balich LLC

(57) ABSTRACT

An assembly for an aircraft propulsion system includes an open propulsor rotor and an open guide vane structure. The open propulsor rotor is rotatable about a rotational axis. The open guide vane structure is axially next to and downstream of the open propulsor rotor. The open guide vane structure includes a plurality of open guide vanes arranged circumferentially about the rotational axis. The open guide vanes include a first open guide vane. The first open guide vane includes a camber line, a leading edge, a trailing edge, a leading edge section and a trailing edge section. The first guide vane extends longitudinally along the camber line from the leading edge to the trailing edge. The leading edge section is configured to pivot about a pivot axis. The trailing edge section is configured to move relative to the leading edge section to change a camber of the first open guide vane.

19 Claims, 9 Drawing Sheets

(56) References Cited

U.S. PATENT DOCUMENTS

| | | | | |
|---|---|---|---|---|
| 5,207,558 | A * | 5/1993 | Hagle | F02C 7/12 |
| | | | | 415/12 |
| 5,314,301 | A * | 5/1994 | Knight | F01D 17/162 |
| | | | | 415/161 |
| 6,139,268 | A * | 10/2000 | Murawski | F01D 5/148 |
| | | | | 415/914 |
| 9,835,044 | B2 * | 12/2017 | Lecordix | F04D 29/563 |
| 10,669,881 | B2 * | 6/2020 | Breeze-Stringfellow | |
| | | | | F02C 7/36 |
| 10,871,073 | B2 * | 12/2020 | Lee | F01D 5/147 |
| 10,934,883 | B2 | 3/2021 | Dyer | |
| 11,111,811 | B2 | 9/2021 | Joly | |
| 11,585,354 | B2 | 2/2023 | Miller | |
| 11,608,743 | B1 * | 3/2023 | Tweedt | B64C 11/18 |
| 11,655,767 | B2 * | 5/2023 | Hrubec | F02C 7/36 |
| | | | | 415/122.1 |
| 11,655,778 | B2 * | 5/2023 | Joly | F01D 5/28 |
| | | | | 60/204 |
| 11,802,525 | B2 * | 10/2023 | Chaudhari | F01D 17/162 |
| 12,203,385 | B1 * | 1/2025 | Morton | F01D 5/147 |
| 2007/0092372 | A1 * | 4/2007 | Carroll | F01D 5/148 |
| | | | | 415/191 |
| 2012/0163960 | A1 * | 6/2012 | Ress, Jr. | F04D 29/563 |
| | | | | 415/173.1 |
| 2014/0130513 | A1 * | 5/2014 | Chiu | F02C 3/06 |
| | | | | 415/150 |
| 2016/0069275 | A1 * | 3/2016 | Lecordix | F02C 9/22 |
| | | | | 415/146 |
| 2016/0130973 | A1 * | 5/2016 | Pachidis | F04D 29/684 |
| | | | | 415/148 |
| 2017/0102006 | A1 * | 4/2017 | Miller | F04D 29/563 |
| 2023/0060832 | A1 * | 3/2023 | Hall | F01D 17/162 |
| 2023/0061349 | A1 * | 3/2023 | Hall | F04D 29/563 |
| 2024/0309775 | A1 * | 9/2024 | Molnar, Jr. | F01D 9/041 |
| 2024/0309886 | A1 * | 9/2024 | Heeter | F04D 29/542 |

FOREIGN PATENT DOCUMENTS

| | | | | |
|---|---|---|---|---|
| FR | | 3082230 A1 * | 12/2019 | B64C 11/32 |
| FR | | 3082230 B1 | 8/2020 | |
| FR | | 3118094 A1 | 6/2022 | |

* cited by examiner

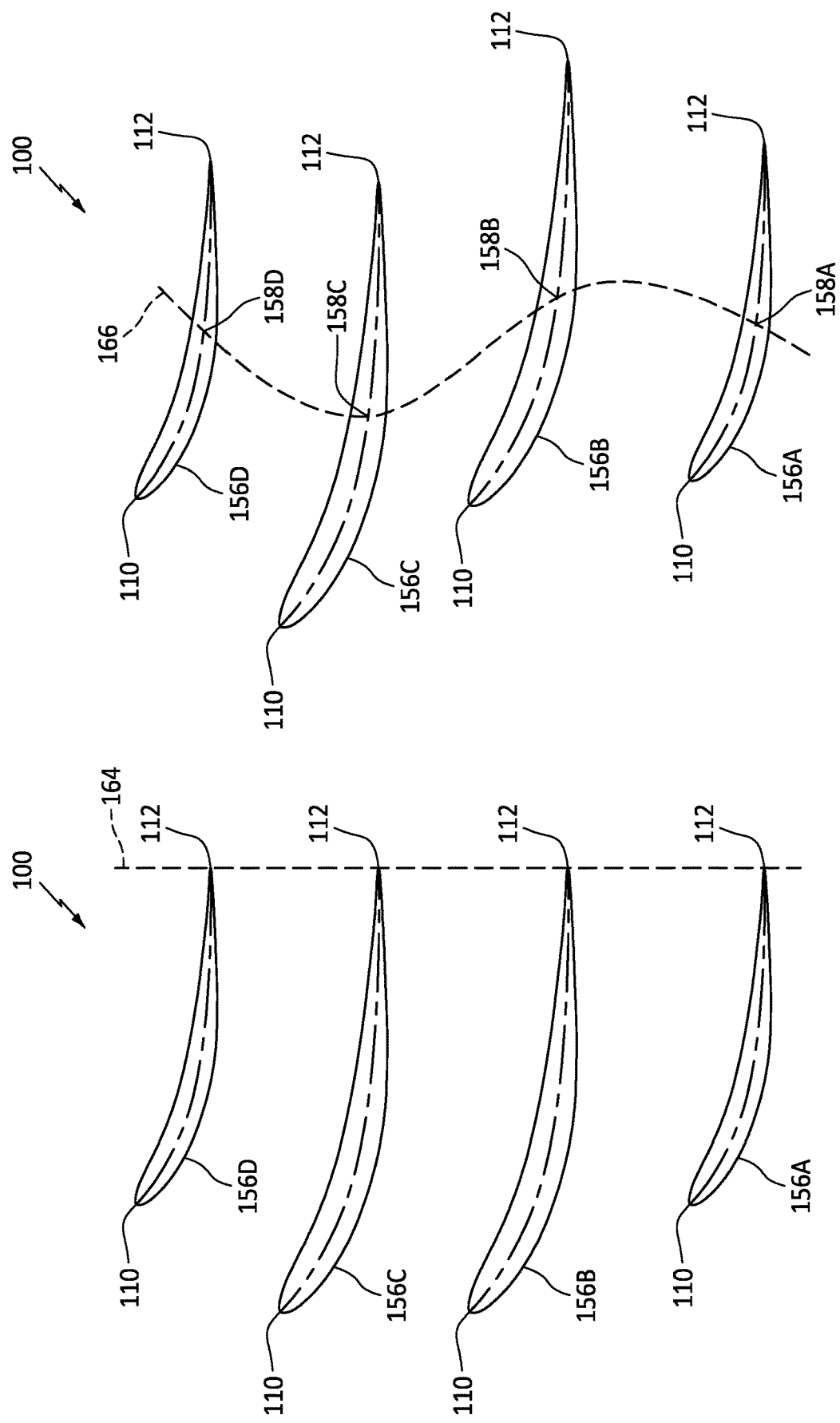

VARIABLE GUIDE VANE FOR AIRCRAFT PROPULSION SYSTEM

BACKGROUND OF THE DISCLOSURE

1. Technical Field

This disclosure relates generally to an aircraft and, more particularly, to a guide vane structure for an aircraft propulsion system.

2. Background Information

An aircraft propulsion system may include a guide vane structure arranged downstream of a propulsor rotor to condition air propelled by the propulsor rotor. Various types and configurations of guide vane structures are known in the art. While these known guide vane structures have various benefits, there is still room in the art for improvement.

SUMMARY OF THE DISCLOSURE

According to an aspect of the present disclosure, an assembly is provided for an aircraft propulsion system. This assembly includes an open propulsor rotor and an open guide vane structure. The open propulsor rotor is configured to rotate about a rotational axis. The open guide vane structure is axially next to and downstream of the open propulsor rotor. The open guide vane structure includes a plurality of open guide vanes arranged circumferentially about the rotational axis. The open guide vanes include a first open guide vane. The first open guide vane includes a camber line, a leading edge, a trailing edge, a leading edge section and a trailing edge section. The first guide vane extends longitudinally along the camber line from the leading edge to the trailing edge. The leading edge section forms the leading edge and is configured to pivot about a pivot axis. The trailing edge section forms the trailing edge and is configured to move relative to the leading edge section to change a camber of the first open guide vane.

According to another aspect of the present disclosure, another assembly is provided for an aircraft propulsion system. This assembly includes a propulsor rotor and a guide vane structure. The propulsor rotor is configured to rotate about a rotational axis. The guide vane structure is axially next to and downstream of the propulsor rotor. The guide vane structure includes a stationary structure and a plurality of guide vanes arranged circumferentially about the rotational axis. The guide vanes includes a first guide vane. The first guide vane includes a camber line, a leading edge, a trailing edge, a leading edge section and a trailing edge section. The first guide vane extends longitudinally along the camber line from the leading edge to the trailing edge. The leading edge section forms the leading edge and is pivotally coupled to stationary structure. The trailing edge section forms the trailing edge and is movably coupled to the leading edge section. The trailing edge section is coupled to the stationary structure through the leading edge section.

According to still another aspect of the present disclosure, another assembly is provided for an aircraft propulsion system. This assembly includes an open propulsor rotor and an open guide vane structure. The open propulsor rotor is configured to rotate about a rotational axis. The open guide vane structure is axially next to and downstream of the open propulsor rotor. The open guide vane structure includes a plurality of open guide vanes arranged circumferentially about the rotational axis. The open guide vanes includes a first open guide vane. The first open guide vane includes a camber line, a leading edge, a trailing edge, a leading edge section and a trailing edge section. The first guide vane extends longitudinally along the camber line from the leading edge to the trailing edge. The leading edge section forms the leading edge. The trailing edge section forms the trailing edge. The first open guide vane is configured to move between a first arrangement and a second arrangement. A camber of the first open guide vane is different when the first open guide vane is in the first arrangement than when the first open guide vane is in the second arrangement. A pitch of the first open guide vane is different when the first open guide vane is in the first arrangement than when the first open guide vane is in the second arrangement.

The camber line may be angularly offset from the rotational axis by a first offset angle at the leading edge. The first offset angle, when the first open guide vane is in the first arrangement, may be different than the first offset angle when the first open guide vane is in the second arrangement. The camber line may be angularly offset from the rotational axis by a second offset angle at the trailing edge. The second offset angle, when the first open guide vane is in the first arrangement, may be equal to the second offset angle when the first open guide vane is in the second arrangement.

The leading edge section may be configured to pivot about a pivot axis to change a pitch of the first guide vane. The trailing edge section may be configured to move relative to the leading edge section to change a camber of the first guide vane.

The propulsor rotor may be configured as or otherwise include an open propulsor rotor. The guide vane structure may be configured as or otherwise include an open guide vane structure.

The trailing edge section may be configured to translate relative to the leading edge section.

The trailing edge section may be configured to swing relative to the leading edge section.

The open guide vane structure may be configured to condition air propelled by the open propulsor rotor.

The first open guide vane may be configured to move between a first arrangement and a second arrangement. The camber of the first open guide vane may be different when the first open guide vane is in the first arrangement than when the first open guide vane is in the second arrangement. A pitch of the first open guide vane may be different when the first open guide vane is in the first arrangement than when the first open guide vane is in the second arrangement.

The first open guide vane may be configured to move between a first arrangement and a second arrangement. The camber line may be angularly offset from the rotational axis by a first offset angle at the leading edge. The camber line may be angularly offset from the rotational axis by a second offset angle at the trailing edge. The first offset angle when the first open guide vane is in the first arrangement may be different than the first offset angle when the first open guide vane is in the second arrangement. The second offset angle when the first open guide vane is in the first arrangement may be equal to or within two degrees of the second offset angle when the first open guide vane is in the second arrangement.

The assembly may also include a support structure. The leading edge section may be pivotally coupled to the support structure. The trailing edge section may be movably coupled to the leading edge section.

The trailing edge section may be coupled to the support structure through the leading edge section.

The trailing edge section may be translatable along the camber line relative to the leading edge section.

The trailing edge section may be pivotable about a second pivot axis relative to the leading edge section.

The pivot axis may be coplanar with the rotational axis.

The pivot axis may be non-coplanar with the rotational axis.

The pivot axis may be perpendicular to the rotational axis when viewed in a reference plane parallel with the rotational axis.

The pivot axis may be angularly offset from the rotational axis by an acute angle when viewed in a reference plane parallel with the rotational axis.

The open propulsor rotor may include a plurality of open propulsor blades arranged circumferentially about the rotational axis. The open propulsor blades may include a first open propulsor blade. The first open propulsor blade may be configured to pivot and change a pitch of the first open propulsor blade.

The assembly may also include a gas generator configured to drive rotation of the open propulsor rotor about the rotational axis. The gas generator may include a flowpath, a compressor section, a combustor section and a turbine section. The flowpath may extend through the compressor section, the combustor section and the turbine section from an inlet into the flowpath to an exhaust from the flowpath.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 15-17 are schematic illustrations of various arrangements of vane stacks.

DETAILED DESCRIPTION

Figure 1:
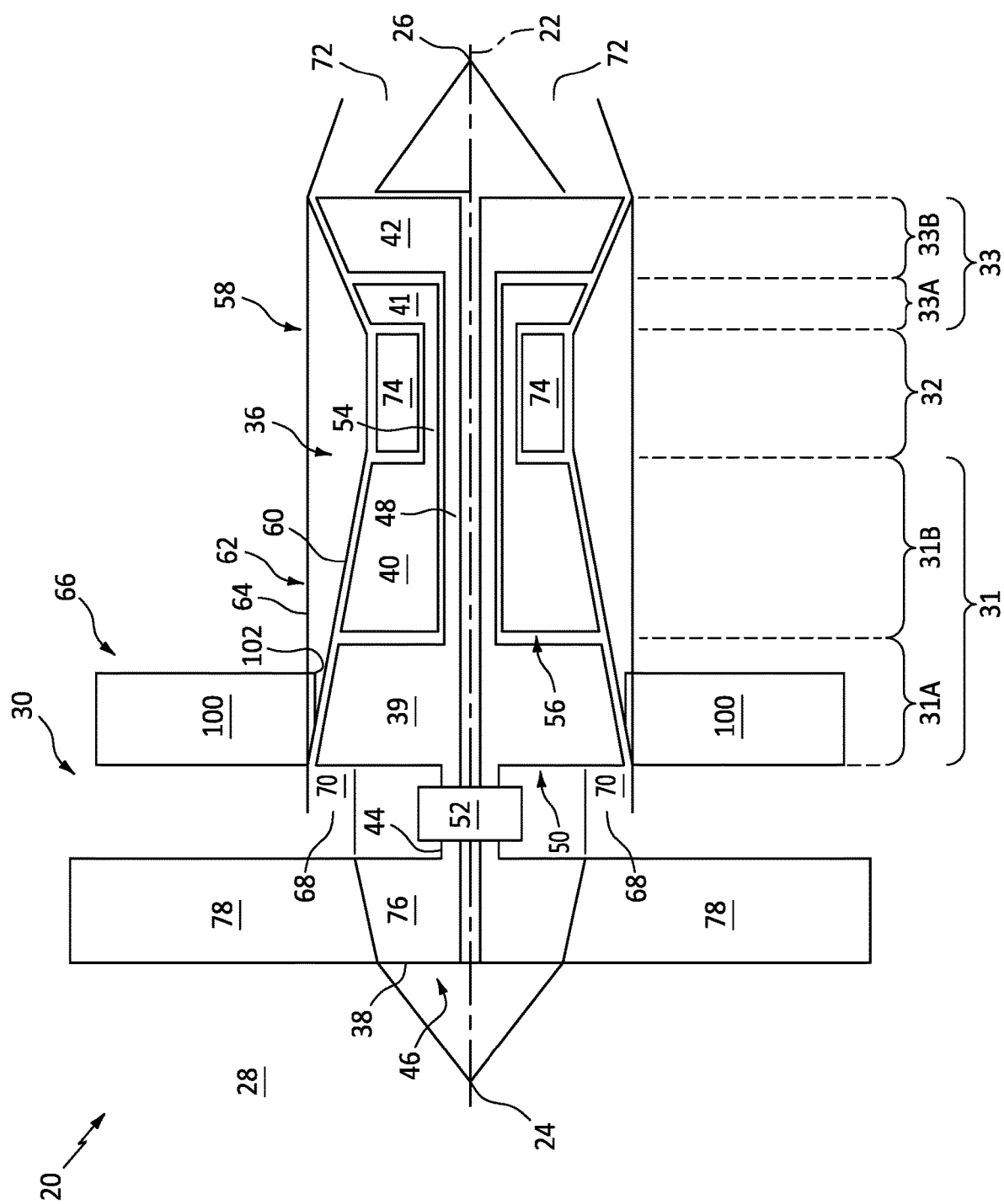
FIG. 1 is a side schematic illustration of an aircraft propulsion system.

FIG. 1 illustrates a propulsion system 20 for an aircraft. The aircraft may be an airplane, a drone (e.g., an unmanned aerial vehicle (UAV)) or any other manned or unmanned aerial vehicle or system. The aircraft propulsion system 20 extends axially along an axis 22 between a forward, upstream end 24 of the aircraft propulsion system 20 and an aft, downstream end 26 of the aircraft propulsion system 20.

The axis 22 may be a centerline axis of the aircraft propulsion system 20 and/or one or more of its members. The axis 22 may also or alternatively be a rotational axis of one or more members of the aircraft propulsion system 20.

The aircraft propulsion system 20 of FIG. 1 is configured as an open rotor propulsion system; e.g., a single rotor and swirl recovery vane (SRV) open rotor propulsion system. Here, the term "open" may describe a propulsion system section and/or a propulsion system component which is open to an environment 28 (e.g., an ambient environment) external to the aircraft propulsion system 20 and, more generally, the aircraft. The aircraft propulsion system 20 of FIG. 1, for example, includes an open propulsion section 30, a compressor section 31, a combustor section 32 and a turbine section 33. The compressor section 31 of FIG. 1 includes a low pressure compressor (LPC) section 31A and a high pressure compressor (HPC) section 31B. The turbine section 33 of FIG. 1 includes a high pressure turbine (HPT) section 33A and a low pressure turbine (LPT) section 33B. At least (or only) the LPC section 31A, the HPC section 31B, the combustor section 32, the HPT section 33A and the LPT section 33B collectively form a gas generator 36; e.g., a turbine engine core.

The propulsion section 30 includes a bladed propulsor rotor 38. The propulsor rotor 38 of FIG. 1 is configured as an open rotor (e.g., an un-ducted rotor) which projects radially into and is exposed to the external environment 28. The LPC section 31A includes a low pressure compressor (LPC) rotor 39. The HPC section 31B includes a high pressure compressor (HPC) rotor 40. The HPT section 33A includes a high pressure turbine (HPT) rotor 41. The LPT section 33B includes a low pressure turbine (LPT) rotor 42. Each of the bladed rotors 39-42 of FIG. 1 is configured as a ducted rotor internal within the aircraft propulsion system 20 and outside of the external environment 28.

The propulsor rotor 38 of FIG. 1 is connected to a propulsor shaft 44. At least (or only) the propulsor rotor 38 and the propulsor shaft 44 collectively form a propulsor rotating assembly 46. This propulsor rotating assembly 46 of FIG. 1 and its members 38 and 44 are rotatable about the axis 22.

The LPC rotor 39 is coupled to and rotatable with the LPT rotor 42. The LPC rotor 39 of FIG. 1, for example, is connected to the LPT rotor 42 through a low speed shaft 48. At least (or only) the LPC rotor 39, the LPT rotor 42 and the low speed shaft 48 collectively form a low speed rotating assembly 50; e.g., a low speed spool of the gas generator 36. This low speed rotating assembly 50 of FIG. 1 and its members 39, 42 and 48 are rotatable about the axis 22; however, it is contemplated the low speed rotating assembly 50 may alternatively be rotatable about another axis radially and/or angularly offset from the axis 22. Referring again to FIG. 1, the low speed rotating assembly 50 is also coupled to the propulsor rotating assembly 46. The low speed rotating assembly 50 of FIG. 1, for example, is connected to the propulsor rotating assembly 46 through a geartrain 52; e.g., an epicyclic gear system, a transmission, etc. With this arrangement, the low speed rotating assembly 50 and its LPT rotor 42 may rotate at a different (e.g., faster) rotational velocity than the propulsor rotating assembly 46 and its propulsor rotor 38. However, it is contemplated the propulsor rotor 38 may alternatively be coupled to the low speed rotating assembly 50 and its LPT rotor 42 without the geartrain 52 such that the LPT rotor 42 may directly drive rotation of the propulsor rotor 38 through a shaft (e.g., the low speed shaft 48) or a shaft assembly.

The HPC rotor 40 is coupled to and rotatable with the HPT rotor 41. The HPC rotor 40 of FIG. 1, for example, is connected to the HPT rotor 41 through a high speed shaft 54. At least (or only) the HPC rotor 40, the HPT rotor 41 and the high speed shaft 54 collectively form a high speed rotating assembly 56; e.g., a high speed spool of the gas generator 36. This high speed rotating assembly 56 of FIG. 1 and its members 40, 41 and 54 are rotatable about the axis 22; however, it is contemplated the high speed rotating assembly 56 may alternatively be rotatable about another axis radially and/or angularly offset from the axis 22.

The engine sections 31A, 31B, 32, 33A and 33B may be arranged sequentially along the axis 22 and are housed within a stationary housing 58 of the aircraft propulsion system 20. This propulsion system housing 58 includes a gas generator case 60 (e.g., a core case) and a nacelle 62. The generator case 60 houses one or more of the propulsion system sections 31A, 31B, 32, 33A and 33B; e.g., the gas generator 36. The generator case 60 of FIG. 1, for example, extends axially along (e.g., axially overlaps) and extends circumferentially about (e.g., circumscribes) the engine sections 31A, 31B, 32, 33A and 33B and their respective bladed rotors 39-42. The generator case 60 may also house the geartrain 52. The nacelle 62 houses and provides an aerodynamic cover over the generator case 60. An exterior wall 64 of the nacelle 62 of FIG. 1, for example, is disposed radially outboard of, extends axially along (e.g., axially overlaps) and extends circumferentially about (e.g., circumscribes) the gas generator 36 and its generator case 60. With this arrangement, the bladed rotors 39-42 are disposed within the propulsion system housing 58. The propulsor rotor 38 is disposed at least partially (or completely) outside of the propulsion system housing 58.

During operation of the aircraft propulsion system 20, ambient air within the external environment 28 is propelled by the propulsor rotor 38 in an aft, downstream direction towards the propulsion system downstream end 26. A major portion (e.g., more than 50%) of this air bypasses the gas generator 36 to provide forward thrust while a minor portion (e.g., less than 50%) of the air flows into the gas generator 36. An outer stream of the air propelled by the propulsor rotor 38, for example, flows axially across a guide vane structure 66 of the propulsion section 30 and outside of the propulsion system housing 58 (along the nacelle wall 64). The guide vane structure 66 is configured to condition (e.g., turn, straighten out) the air propelled by the propulsor rotor 38, for example, to remove or reduce circumferential swirl and thereby enhance the forward thrust. An inner stream of the air propelled by the propulsor rotor 38 flows through an airflow inlet 68 of a core flowpath 70 into the aircraft propulsion system 20 and its gas generator 36. The core flowpath 70 extends sequentially through the LPC section 31A, the HPC section 31B, the combustor section 32, the HPT section 33A and the LPT section 33B from the core inlet 68 to a combustion products exhaust 72 from the core flowpath 70 into the external environment 28. The air entering the core flowpath 70 may be referred to as "core air".

The core air is compressed by the LPC rotor 39 and the HPC rotor 40 and directed into a combustion chamber 74 (e.g., an annular combustion chamber) of a combustor (e.g., an annular combustor) in the combustor section 32. Fuel is injected into the combustion chamber 74 and mixed with the compressed core air to provide a fuel-air mixture. This fuel-air mixture is ignited and combustion products thereof flow through and sequentially drive rotation of the HPT rotor 41 and the LPT rotor 42. The rotation of the HPT rotor 41 and the LPT rotor 42 respectively drive rotation of the HPC rotor 40 and the LPC rotor 39 and, thus, compression of the air received from the core inlet 68. The rotation of the LPT rotor 42 also drives rotation of the propulsor rotor 38 through the geartrain 52. The rotation of the propulsor rotor 38, in turn, propels the ambient air within the external environment 28 in the aft, downstream direction. With this arrangement, the gas generator 36 powers operation of (e.g., drives rotation of) the propulsor rotor 38 during aircraft propulsion system operation.

The propulsor rotor 38 of FIG. 1 includes a propulsor rotor base 76 (e.g., a disk or a hub) and a plurality of open propulsor blades 78 (e.g., airfoils). The propulsor blades 78 are arranged circumferentially about the rotor base 76 and the axis 22 in an array; e.g., a circular array. Each of the propulsor blades 78 is connected to (e.g., formed integral with or otherwise attached to) the rotor base 76.

Figure 2:
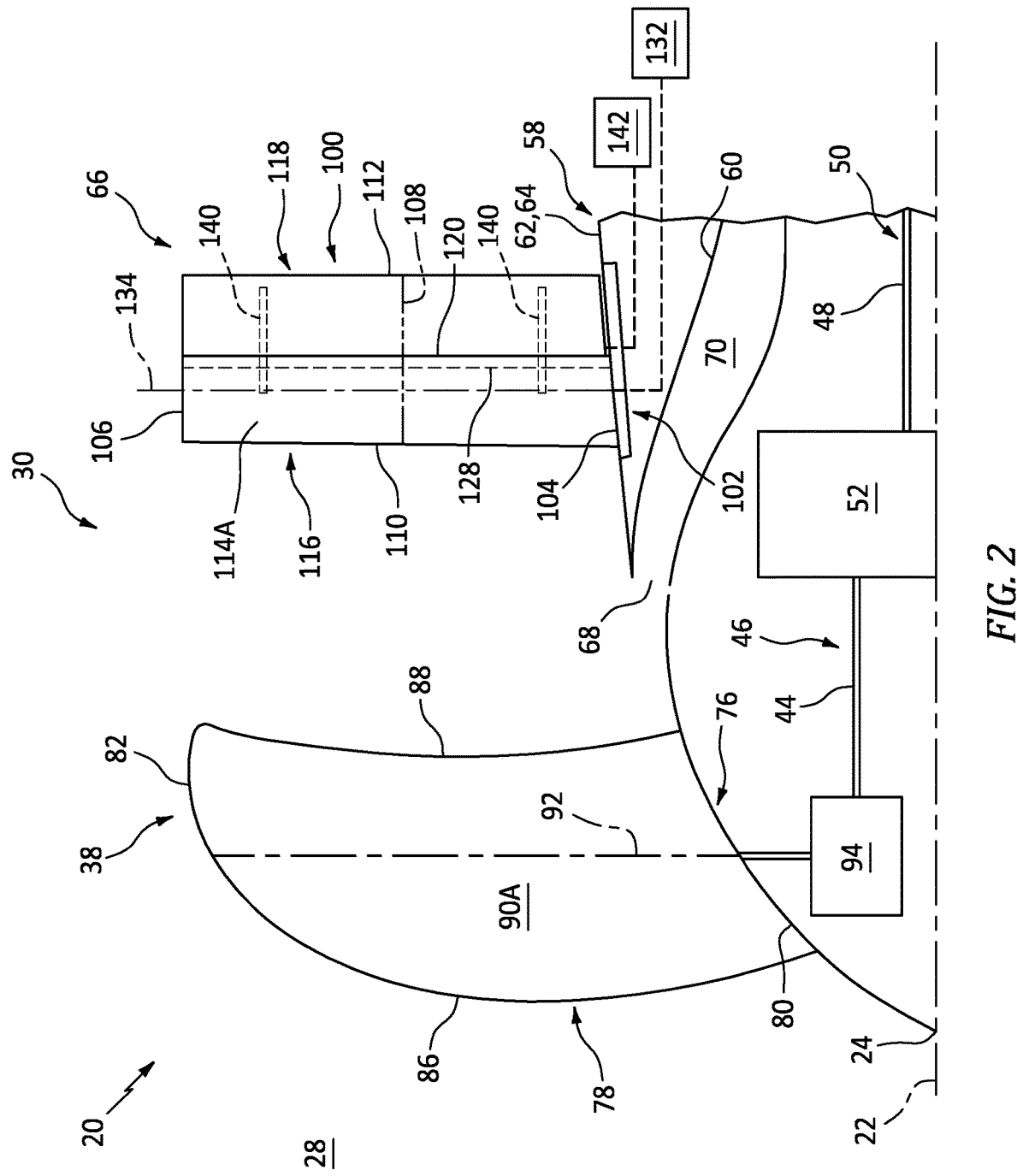
FIG. 2 is a partial schematic illustration of the aircraft propulsion system at a propulsion section.
Figure 3:
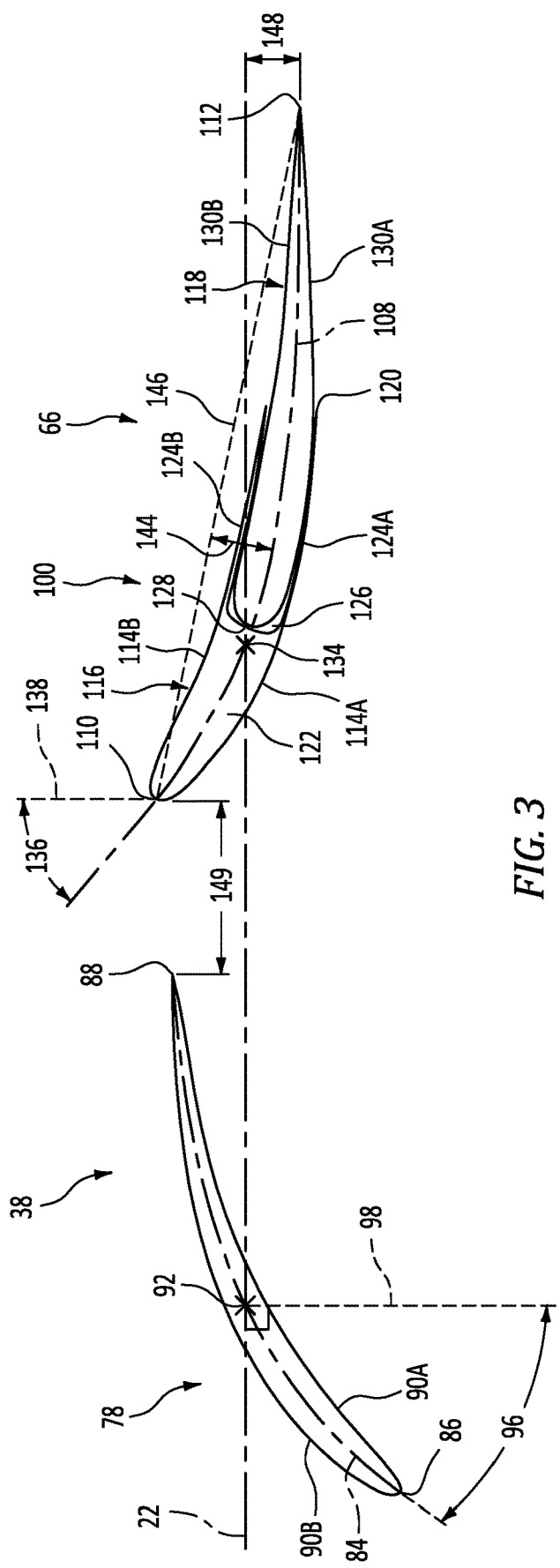
FIGS. 3 and 4 are plan view illustrations of a propulsor blade with a guide vane in various arrangements.
Figure 4:
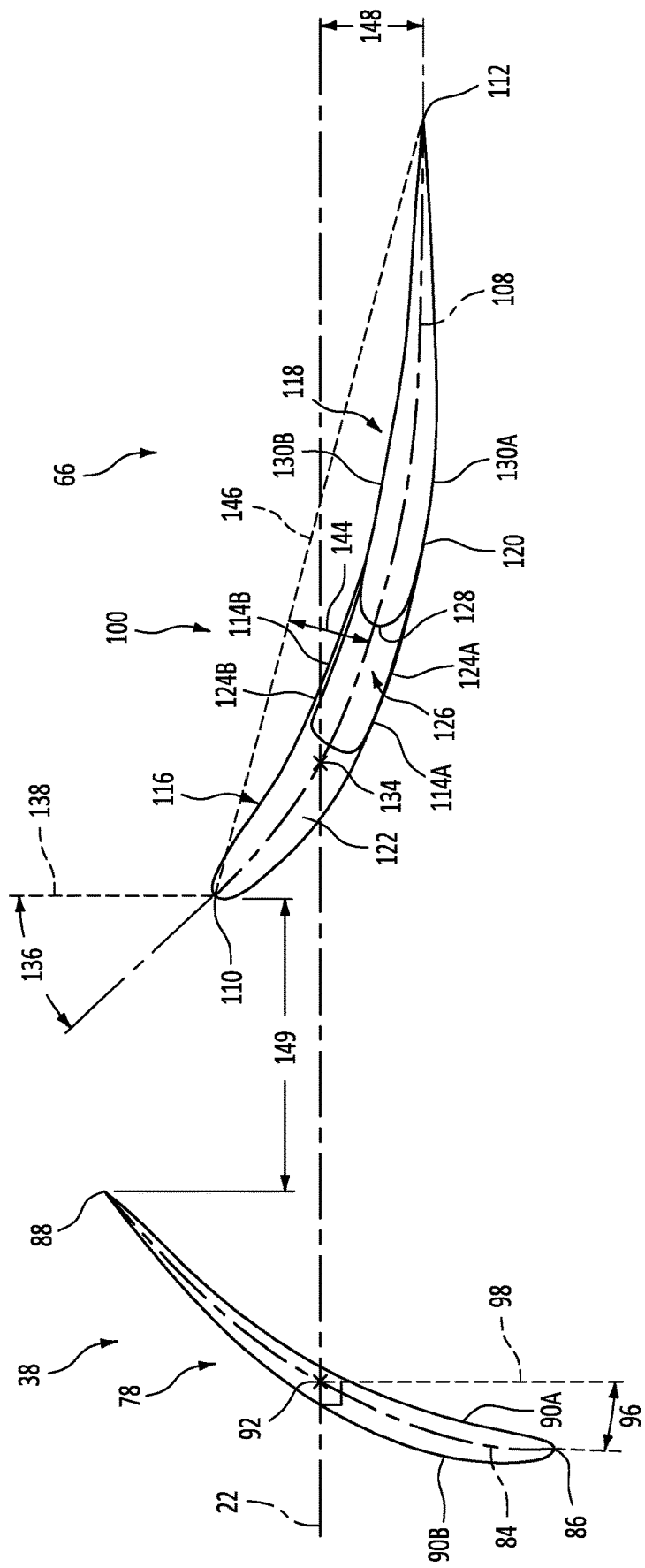

Referring to FIG. 2, each of the propulsor blades 78 projects spanwise along a span line of the respective propulsor blade 78 (e.g., radially relative to the axis 22) out from an exterior surface 80 of the rotor base 76, into the external environment 28, to an unshrouded, distal tip 82 of the respective propulsor blade 78. Each propulsor blade 78 is thereby configured as an un-ducted and unshrouded propulsor blade 78 which is exposed to (e.g., disposed in) the surrounding external environment 28. Referring to FIGS. 3 and 4, each propulsor blade 78 extends longitudinally along a camber line 84 of the respective propulsor blade 78 from a leading edge 86 of the respective propulsor blade 78 to a trailing edge 88 of the respective propulsor blade 78. Each propulsor blade 78 extends laterally between and to opposing side exterior surfaces 90A and 90B (generally referred to as "90") of the respective propulsor blade 78. The first blade exterior surface 90A of FIGS. 3 and 4 is a concave, pressure side surface of the respective propulsor blade 78. The second blade exterior surface 90B of FIGS. 3 and 4 is a convex, suction side surface of the respective propulsor blade 78. Each of these blade exterior surfaces 90 extends longitudinally along the blade camber line 84 between and meet at the respective blade leading edge 86 and the respective blade trailing edge 88. Referring to FIG. 2, each blade element 86, 88, 90A, 90B (the blade exterior surface 90B not visible in FIG. 2) extends spanwise from the base exterior surface 80 to the respective blade tip 82.

Each propulsor blade 78 of FIG. 2 may be configured to pivot about a respective pivot axis 92. This blade pivot axis 92 extends radially relative to the axis 22. The blade pivot axis 92 of FIG. 2, for example, is arranged perpendicular to the axis 22 when viewed, for example, in a reference plane parallel with (e.g., including) the axis 22; e.g., plane of FIG. 2. Each propulsor blade 78 of FIG. 2 is operatively coupled with a blade actuator 94. This blade actuator 94 is configured to pivot each propulsor blade 78 about its respective blade pivot axis 92 between a first position (e.g., see FIG. 3) and a second position (e.g., see FIG. 4). By moving the respective propulsor blade 78 from (or about) the first position of FIG. 3 to (or towards) the second position of FIG. 4 (or vice versa or somewhere therebetween), a pitch of the respective propulsor blade 78 may be changed; e.g., decreased (or increased). The blade pitch may be measured as an angle 96 between the respective blade camber line 84 at the respective blade leading edge 86 and a plane 98 of rotation of the propulsor rotor 38; e.g., a plane perpendicular to the axis 22. The propulsor blades 78 may be moved towards or to the first position of FIG. 3 to increase the thrust generated by the propulsor rotor 38. The propulsor blades 78 may be moved towards or to the second position of FIG. 4 to decrease the thrust generated by the propulsor rotor 38. Note, while the blade pivot axis 92 is shown as being perpendicular to the axis 22 in FIG. 2, it is contemplated the blade pivot axis 92 may or may not be coincident with the axis 22. Moreover, it is also contemplated the blade pivot axis 92 may be angularly offset from the axis 22 by an acute angle or an obtuse angle when viewed, for example, in the reference plane; e.g., the plane of FIG. 2.

The guide vane structure 66 of FIG. 1 includes a plurality of open exit guide vanes 100 (e.g., variable position and geometry airfoils) arranged circumferentially about the axis 22 in an array; e.g., a circular array. This guide vane structure 66 and its guide vanes 100 are arranged axially next to (e.g., adjacent) the propulsor rotor 38 and its propulsor blades 78. The guide vane structure 66 and its guide vanes 100 of FIG. 1, for example, are arranged downstream of the propulsor rotor 38 and its propulsor blades 78, without (e.g., any) other elements axially therebetween to obstruct, turn and/or otherwise influence the air propelled by the propulsor rotor 38 to the guide vane structure 66 for example. Each of the guide vanes 100 of FIG. 1 is coupled to a support structure 102 of the propulsion system housing 58. This support structure 102 may be a support frame, a case or another fixed structure of the propulsion system housing 58. The support structure 102 may also or alternatively form a radial inner platform for the guide vane structure 66.

Referring to FIG. 2, each of the guide vanes 100 projects spanwise along a span line of the respective guide vane 100 (e.g., radially relative to the axis 22) out from an exterior surface 104 of the propulsion system housing 58, into the external environment 28, to an unshrouded, distal tip 106 of the respective guide vane 100. Each guide vane 100 is thereby configured as an un-ducted and unshrouded guide vane which is exposed to (e.g., disposed in) the surrounding external environment 28. Referring to FIGS. 3 and 4, each guide vane 100 extends longitudinally along a camber line 108 of the respective guide vane 100 from a leading edge 110 of the respective guide vane 100 to a trailing edge 112 of the respective guide vane 100. Each guide vane 100 extends laterally between and to opposing side exterior surfaces 114A and 114B (generally referred to as "114") of the respective guide vane 100. The first vane exterior surface 114A of FIGS. 3 and 4 is a convex, suction side surface of the respective guide vane 100. The second vane exterior surface 114B of FIGS. 3 and 4 is a concave, pressure side surface of the respective guide vane 100. Each of these vane exterior surfaces 114 extends longitudinally along the vane camber line 108 between and meet at the respective vane leading edge 110 and the respective vane trailing edge 112. Referring to FIG. 2, each vane element 110, 112, 114A, 114B (the vane exterior surface 114B not visible in FIG. 2) extends spanwise from the housing exterior surface 104 to the respective vane tip 106.

Each guide vane 100 of FIG. 2 includes a leading edge section 116 and a trailing edge section 118. The leading edge section 116 is disposed at and (e.g., completely) forms the respective vane leading edge 110. The leading edge section 116 of FIG. 2, for example, extends longitudinally along the respective vane camber line 108 from a downstream end 120 of the leading edge section 116 to the respective vane leading edge 110. The leading edge section 116 extends spanwise along the respective vane leading edge 110 from (or about) the housing exterior surface 104 to the respective vane tip 106. Referring to FIGS. 3 and 4, the leading edge section 116 extends laterally between and to the vane exterior surfaces 114.

The leading edge section 116 of FIGS. 3 and 4 includes a leading edge section base 122 and one or more leading edge section fairings 124A and 124B (generally referred to as "124"); e.g., sidewalls, extensions, etc. The section base 122 is disposed at and forms the respective vane leading edge 110. Each of the section fairings 124 is disposed at the downstream end 120 of the leading edge section 116. Each section fairing 124 of FIGS. 3 and 4, for example, projects out from the section base 122, longitudinally along the respective vane camber line 108, to the downstream end 120 of the leading edge section 116. The first side fairing 124A is disposed laterally at and partially forms the first vane exterior surface 114A. The second side fairing 124B is disposed laterally at and partially forms the second vane exterior surface 114B.

The section base 122, the first side fairing 124A and the second side fairing 124B of FIGS. 3 and 4 form a channel 126 in the leading edge section 116. This channel 126 projects longitudinally along the respective vane camber line 108 into the leading edge section 116 from the downstream end 120 of the leading edge section 116 to the section base 122. The channel 126 extends laterally within the leading edge section 116 between the first side fairing 124A and the second side fairing 124B. The channel 126 may extend spanwise within, into or through the leading edge section 116.

The trailing edge section 118 is disposed at and (e.g., completely) forms the respective vane trailing edge 112. The trailing edge section 118 of FIG. 2, for example, extends longitudinally along the respective vane camber line 108 from an upstream end 128 of the trailing edge section 118 to the respective vane trailing edge 112. The trailing edge section 118 extends spanwise along the respective vane trailing edge 112 from the housing exterior surface 104 to the respective vane tip 106. Referring to FIGS. 3 and 4, the trailing edge section 118 extends laterally between and to the vane exterior surfaces 114.

The trailing edge section 118 projects longitudinally along the respective vane camber line 108 into the channel 126. The first side fairing 124A is laterally adjacent a first side 130A of the trailing edge section 118, and longitudinally and spanwise overlaps the trailing edge section 118 and its first side 130A. Here, the section base 122, the first side fairing 124A and a downstream (e.g., uncovered) portion of the trailing edge section 118 collectively form the first vane exterior surface 114A. The second side fairing 124B is laterally adjacent a second side 130B of the trailing edge section 118, and longitudinally and spanwise overlaps the trailing edge section 118 and its second side 130B. Here, the section base 122, the second side fairing 124B and the downstream portion of the trailing edge section 118 collectively form the second vane exterior surface 114B.

Referring to FIG. 2, each guide vane 100 is moveably coupled to the propulsion system housing 58 and its support structure 102. The leading edge section 116 of FIG. 2, for example, is pivotally coupled to the propulsion system housing 58 and its support structure 102. The leading edge section 116 is also operatively coupled with a vane pitch actuator 132. This vane pitch actuator 132 is configured to pivot or otherwise move the respective guide vane 100 and its leading edge section 116 about a pivot axis 134 of the respective guide vane 100 and its leading edge section 116 between a first position (e.g., see FIG. 3) and a second position (e.g., see FIG. 4). By pivoting the leading edge section 116 from (or about) the first position of FIG. 3 to the second position of FIG. 4, a pitch of the respective guide vane 100 may be changed; e.g., decreased (or increased).

The vane pitch may be measured as an angle 136 between the respective vane camber line 108 at the respective vane leading edge 110 and a face plane 138 of the guide vane structure 66 and its guide vanes 100; e.g., a plane perpendicular to the axis 22.

The vane pitch may be changed (e.g., decreased or increased) based on flow characteristics of the air propelled by the propulsor rotor 38 and/or the blade pitch. For example referring to FIG. 3, where the propulsor rotor 38 imparts a relatively small degree of swirl onto the air being propelled towards the guide vane structure 66 (e.g., where the blade pitch is relatively large), each guide vane 100 may be arranged with a relatively large vane pitch; e.g., a relatively coarse vane pitch. Now referring to FIG. 4, where the propulsor rotor 38 imparts a relatively large degree of swirl onto the air being propelled towards the guide vane structure 66 (e.g., where the blade pitch is relatively small), each guide vane 100 may be arranged with a relatively small vane pitch; e.g., a relatively fine vane pitch.

Referring to FIG. 2, the trailing edge section 118 is coupled to the propulsion system housing 58 and its support structure 102 (e.g., only) through the leading edge section 116. The trailing edge section 118, for example, may be coupled to the leading edge section 116 by one or more (e.g., longitudinally extending) track systems 140. The trailing edge section 118 of FIG. 2 is also operatively coupled with a vane camber actuator 142. This vane camber actuator 142 is configured to move the trailing edge section 118 relative to the leading edge section 116 between a retracted position (e.g., see FIG. 3) and an extended position (e.g., see FIG. 4). The trailing edge section 118, in particular, is configured to translate longitudinally along the respective vane camber line 108 between the retracted position of FIG. 3 and the extended position of FIG. 4. By moving the trailing edge section 118 from (or about) the retracted position of FIG. 3 to (or towards) the extended position of FIG. 4 (or vice versa, or somewhere in between), a camber of the respective guide vane 100 may be changed; e.g., increased (or decreased). The vane camber describes a curvature of the respective guide vane 100. For example, as vane camber increases, a (e.g., maximum) distance 144 between the respective vane camber line 108 and a chord line 146 of the respective guide vane 100 may also increase.

The vane camber may be changed (e.g., increased or decreased) based on the vane pitch. For example, as the vane pitch decreases from FIG. 3 to FIG. 4, the vane camber may be increased from FIG. 3 to FIG. 4 to accommodate a (e.g., otherwise) changing airflow direction of the air being discharged from the guide vane structure 66. For example, the vane camber may be changed to more closely (e.g., within 2 or 5 degrees) or completely maintain a uniform (the same) offset angle 148 between the vane camber line 108 of the respective guide vane 100 at the vane trailing edge 112 and the axis 22 between the arrangements of FIGS. 3 and 4. The vane camber may thereby be changed to effectively maintain a downstream portion of the respective guide vane 100 and its trailing edge section 118 at the vane trailing edge 112 stationary. In this manner, the leading edge sections 116 may be moved based on an arrangement of the propulsor rotor 38 and its propulsor blades 78, while the guide vanes 100 may continue to substantially de-swirl the airflow and thereby increase (e.g., maximize) thrust recovery.

As the trailing edge section 118 moves (e.g., longitudinally translates) from the retracted position of FIG. 3 to the extended position of FIG. 4, a longitudinal length of the respective guide vane 100 increases. This longitudinal length is measured along the respective vane camber line 108 from the respective vane leading edge 110 to the respective vane trailing edge 112. Similarly, as the trailing edge section 118 moves (e.g., longitudinally translates) from the extended position of FIG. 4 to the retracted position of FIG. 3, the longitudinal length of the respective guide vane 100 decreases. In some embodiments, an axial distance 149 between the guide vanes 100 and the propulsor blades 78 may change (e.g., increase or decrease) between the arrangements of FIGS. 3 and 4.

Figure 6:
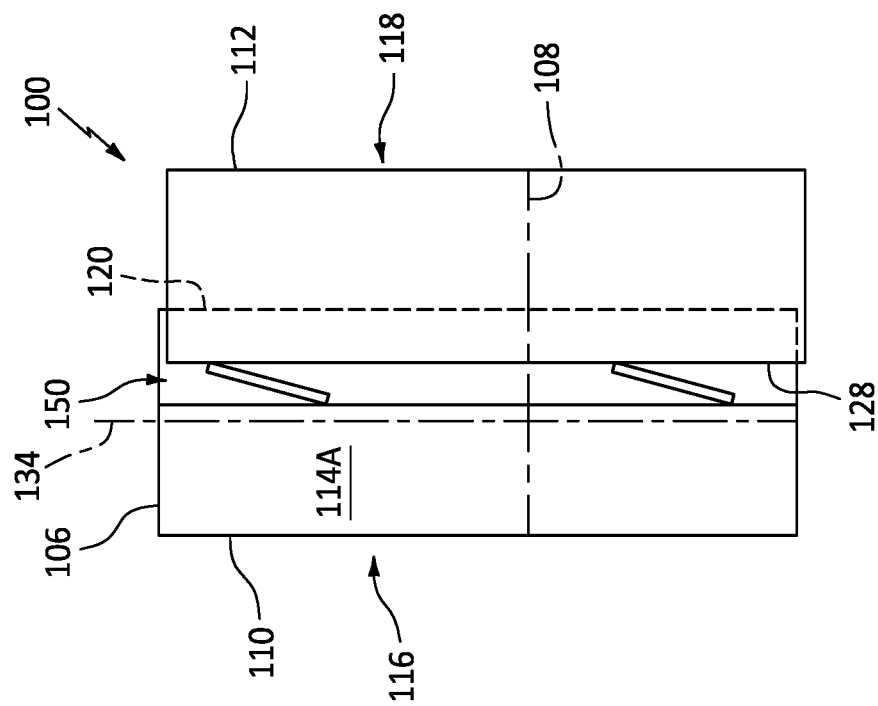
FIGS. 5 and 6 are side schematic illustrations of another guide vane in various arrangements.
Figure 5:
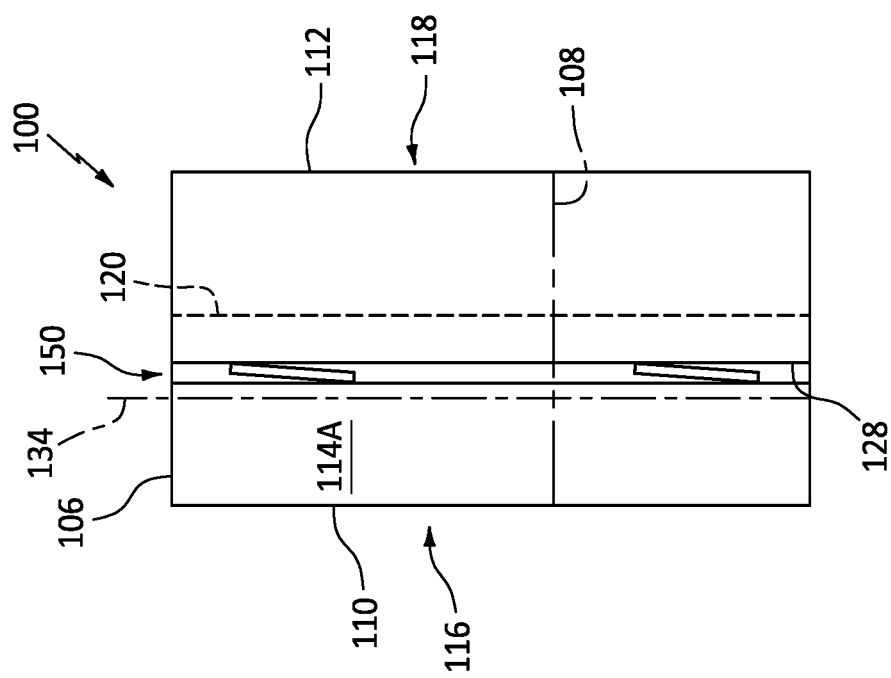

While the trailing edge section 118 may be operatively coupled to the leading edge section 116 through one or more track systems 140 (see FIG. 2) as described above, the present disclosure is not limited to such an exemplary coupling. For example, referring to FIGS. 5 and 6, the trailing edge section 118 may alternatively be coupled to the leading edge section 116 through a four bar linkage 150, which includes the leading edge section 116 and the trailing edge section 118 as two elements of the four bar linkage 150. With such an arrangement, the trailing edge section 118 may also move radially/spanwise relative to the leading edge section 116. Moreover, while the trailing edge section 118 is shown in FIGS. 5 and 6 as moving radially inward as it is being extended longitudinally away from the leading edge section 116, it is contemplated the trailing edge section 118 may alternatively move radially outward as it is being extended longitudinally away from the leading edge section 116.

Figure 7:
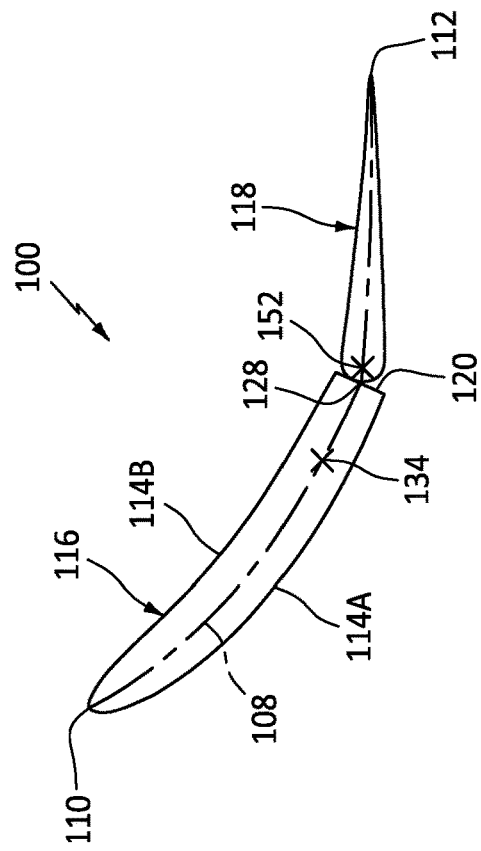
FIGS. 7 and 8 are plan view illustrations of another guide vane in various arrangements.
Figure 8:
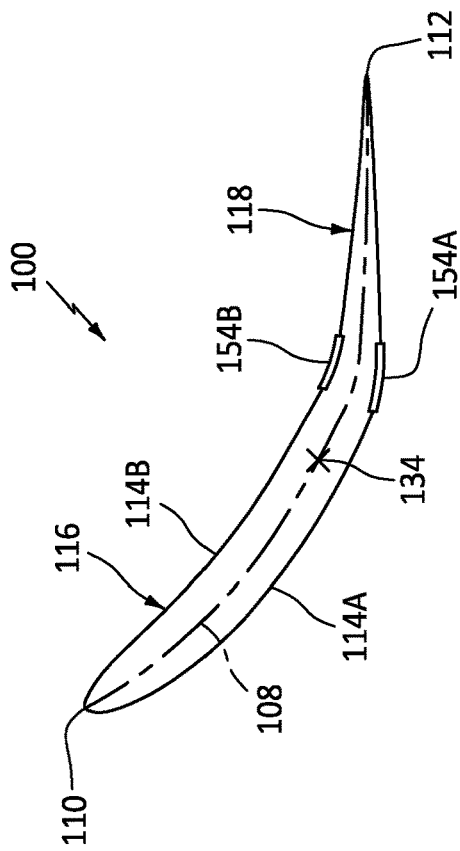
Figure 9:
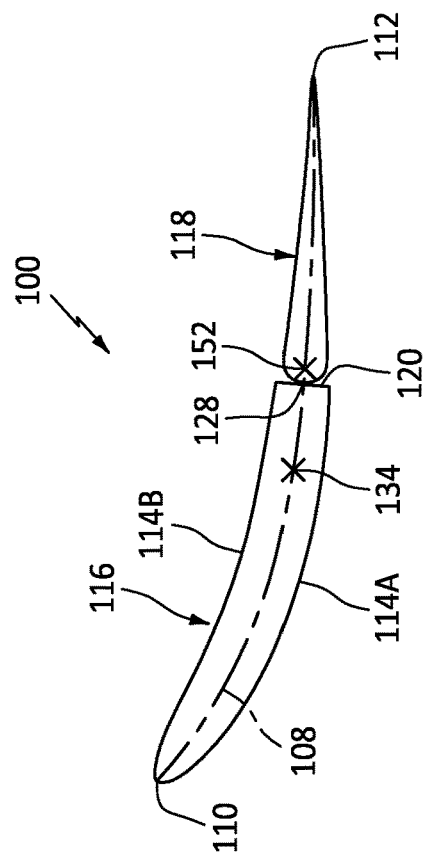
FIGS. 9 and 10 are plan view illustrations of still another guide vane in various arrangements.
Figure 10:
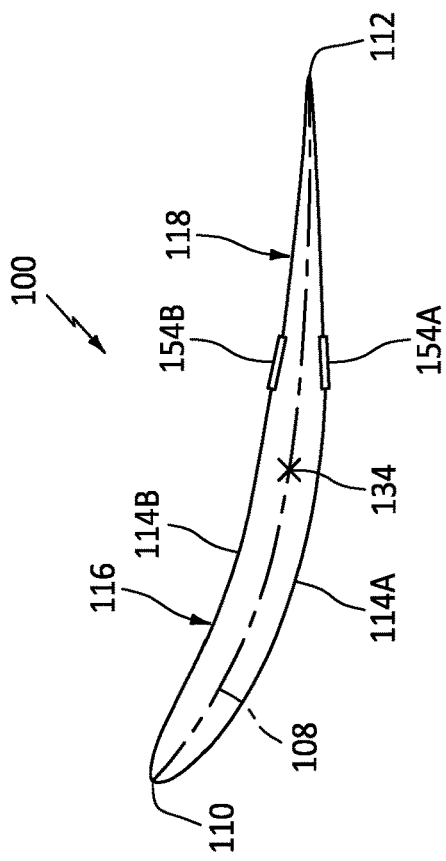

In some embodiments, referring to FIGS. 3-6, the trailing edge section 118 is configured to longitudinally translate relative to the leading edge section 116. The present disclosure, however, is not limited to such longitudinal movement of the trailing edge section 118 to effect the change in vane camber. For example, referring to FIGS. 7 and 8, the trailing edge section 118 may alternatively be pivotally attached to the leading edge section 116. The trailing edge section 118 of FIGS. 7 and 8 may thereby pivot about an intra-vane pivot axis 152 between a first position of FIG. 7 and a second position of FIG. 8 to change the vane camber. Note, this pivoting of the trailing edge section 118 between the first position of FIG. 7 and the second position of FIG. 8 is relative to the leading edge section 116. However, given the (e.g., concurrent) pivoting of the leading edge section 116 about the vane pivot axis 134 from its first position in FIG. 7 to its second position in FIG. 8, the trailing edge section 118 may appear to remain substantially stationary (e.g., at least with respect to the offset angle 148; see FIGS. 3 and 4) between FIGS. 7 and 8. In another example, referring to FIGS. 9 and 10, the trailing edge section 118 may alternatively be connected to the leading edge section 116 with shape memory material 154A and 154B (generally referred to as "154"). This shape memory material 154 may be selectively actuated to effectively pivot or otherwise move the trailing edge section 118 between a first position of FIG. 9 and a second position of FIG. 10. Note, this movement of the trailing edge section 118 between the first position of FIG. 9 and the second position of FIG. 10 is relative to the leading edge section 116. However, given the (e.g., concurrent) pivoting of the leading edge section 116 about the vane pivot axis 134 from its first position in FIG. 9 to its second position in FIG. 10, the trailing edge section 118 may appear to remain substantially stationary (e.g., at least with respect to the offset angle 148; see FIGS. 3 and 4) between FIGS. 9 and 10.

Figure 11:
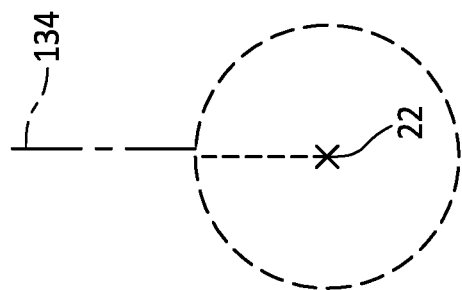
FIG. 11 schematically illustrates a vane pivot axis coplanar with a propulsion system axis.

In some embodiments, referring to FIG. 11, the vane pivot axis 134 may be coplanar with the axis 22. The vane pivot axis 134 of FIG. 11, for example, is coincident with the axis 22. In other embodiments, referring to FIG. 12, the vane pivot axis 134 may be non-coplanar with the axis 22. The vane pivot axis 134 of FIG. 12, for example, is non-coincident with the axis 22.

Figure 13:
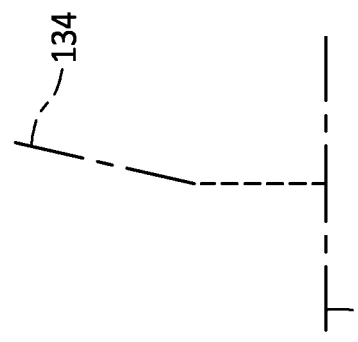
FIG. 13 schematically illustrates the vane pivot axis perpendicular to the propulsion system axis.
Figure 14A:
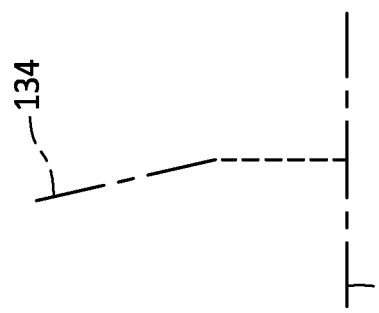
FIGS. 14A and 14B schematically illustrate the vane pivot axis acutely angled relative to the propulsion system axis.
Figure 12:
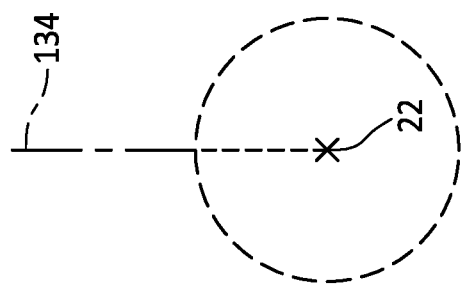
FIG. 12 schematically illustrates the vane pivot axis non-coplanar with the propulsion system axis.
Figure 14B:
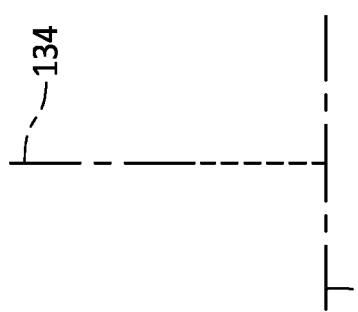

In some embodiments, referring to FIG. 13, the vane pivot axis 134 may be perpendicular to the axis 22 when viewed in a reference plane parallel with the axis 22. This reference plane may include the axis 22 or may be laterally offset from the axis 22. In other embodiments, referring to FIGS. 14A and 14B, the vane pivot axis 134 may be angularly offset from the axis 22 by an included angle (e.g., a non-zero acute angle) when viewed in the reference plane. In FIG. 14A, the vane pivot axis 134 is tilted in a forward, upstream direction. In FIG. 14B, the vane pivot axis 134 is tilted in an aft, downstream direction. Whether the vane pivot axis 134 is arranged as shown in FIG. 13 or FIG. 14A, 14B, the vane pivot axis 134 may be coplanar as shown in FIG. 11 or non-coplanar as shown in FIG. 12.

Figure 16A:
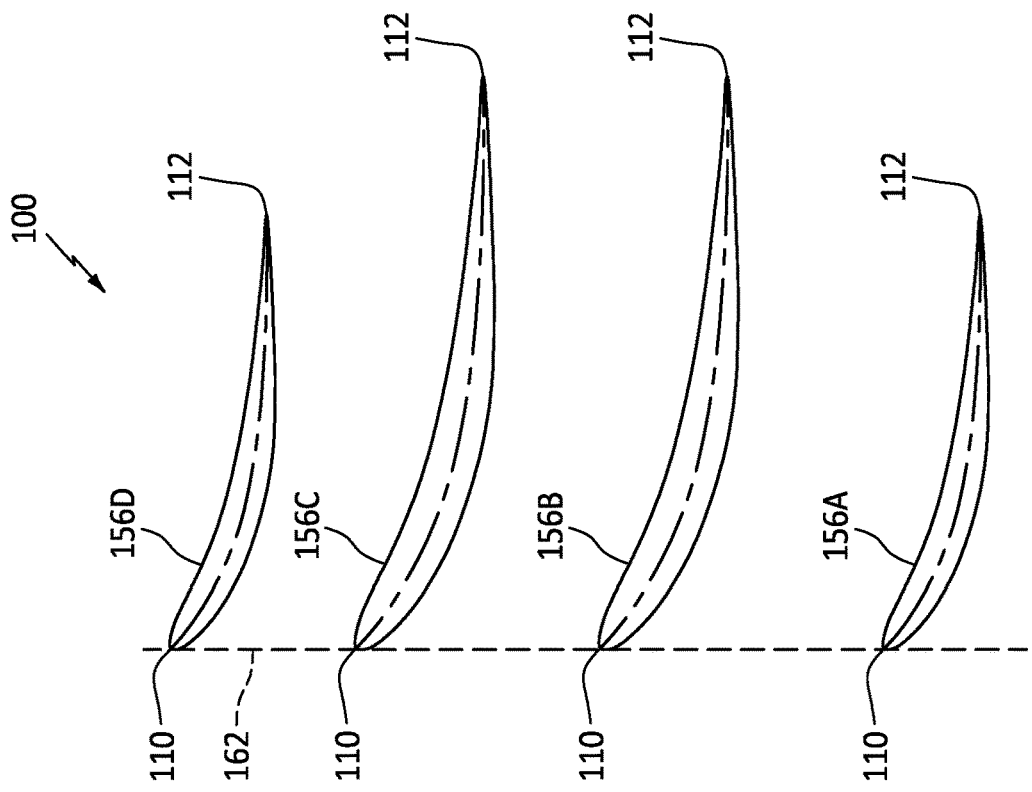
Figure 15:
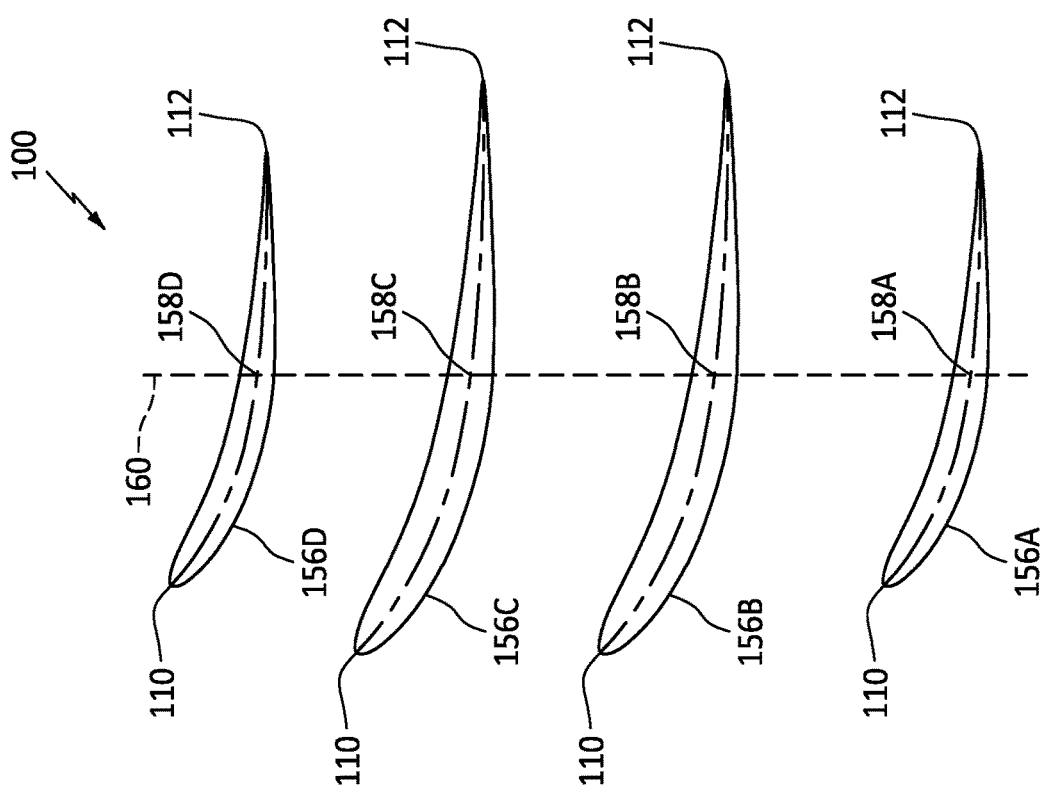

Referring to FIGS. 15-17, each guide vane 100 may be divided into multiple vane sections 156A-D (generally referred to as "156") along its span. Each of these vane sections 156A-D have a respective center of gravity 158A-D (generally referred to as "158"); see FIGS. 15 and 17. In some embodiments, referring to FIG. 15, the centers of gravity 158 of the vane sections 156 may be aligned along a straight reference line 160; e.g., the span line. In other embodiments, referring to FIG. 16A, the leading edges 110 of the vane sections 156 may be aligned along a straight reference line 162; e.g., the span line. In other embodiments, referring to FIG. 16B, the trailing edges 112 of the vane sections 156 may be aligned along a straight reference line 164; e.g., the span line. In still other embodiments, referring to FIG. 17, the centers of gravity 158 of the vane sections 156 may be aligned along a non-straight reference line 166; e.g., a generally radially extending curved, splined or otherwise non-straight reference line.

Referring to FIG. 2, the guide vane structure 66 is described above with multiple actuators 132 and 142. While these actuators 132 and 142 are described above as independently effecting changes in different vane parameters, the operation of the actuators 132 and 142 may be timed for concurrent and/or temporally overlapping actuation. However, in some embodiments, it is contemplated the actuators 132 and 142 may also be independently operated to further independently adjust the configuration of the guide vanes 100. In other embodiments, it is contemplated the movement (e.g., translation and/or pivoting) of the trailing edge section 118 may be mechanically tied to the movement (e.g., pivoting) of the leading edge section 116 such that the vane camber actuator 142 may be omitted.

The propulsion section 30 of FIG. 1 is described above with a tractor configuration; e.g., where the propulsor rotor 38 is disposed at or otherwise near the propulsion system upstream end 24. It is contemplated, however, the propulsion section 30 may alternatively be disposed at or otherwise near the propulsion system downstream end 26 to provide a pusher fan configuration. It is also contemplated the propulsion section 30 and its guide vane structure 66 may alternatively be used with other types of propulsion systems such as, for example, a turbofan or other ducted propulsion system. Moreover, while the gas generator 36 is described above with a forward flow configuration, it is contemplated the gas generator 36 may alternatively be configured with a reverser flow configuration.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
   an open propulsor rotor configured to rotate about a rotational axis; and
   an open guide vane structure axially next to and downstream of the open propulsor rotor, the open guide vane structure including a plurality of open guide vanes arranged circumferentially about the rotational axis, and the plurality of open guide vanes comprising a first open guide vane;
   the first open guide vane comprising a camber line, a leading edge, a trailing edge, a leading edge section and a trailing edge section, the first guide vane extending longitudinally along the camber line from the leading edge to the trailing edge, the leading edge section forming the leading edge and configured to pivot about a pivot axis, and the trailing edge section forming the trailing edge and configured to move relative to the leading edge section to change a camber of the first open guide vane.

2. The assembly of claim 1, wherein the open guide vane structure is configured to condition air propelled by the open propulsor rotor.

3. The assembly of claim 1, wherein
   the first open guide vane is configured to move between a first arrangement and a second arrangement;
   the camber of the first open guide vane is different when the first open guide vane is in the first arrangement than when the first open guide vane is in the second arrangement; and
   a pitch of the first open guide vane is different when the first open guide vane is in the first arrangement than when the first open guide vane is in the second arrangement.

4. The assembly of claim 1, wherein
   the first open guide vane is configured to move between a first arrangement and a second arrangement;
   the camber line is angularly offset from the rotational axis by a first offset angle at the leading edge, and the camber line is angularly offset from the rotational axis by a second offset angle at the trailing edge;
   the first offset angle when the first open guide vane is in the first arrangement is different than the first offset angle when the first open guide vane is in the second arrangement; and
   the second offset angle when the first open guide vane is in the first arrangement is equal to or within two degrees of the second offset angle when the first open guide vane is in the second arrangement.

5. The assembly of claim 1, further comprising:
   a support structure;
   the leading edge section pivotally coupled to the support structure; and
   the trailing edge section movably coupled to the leading edge section.

6. The assembly of claim 5, wherein the trailing edge section is coupled to the support structure through the leading edge section.

7. The assembly of claim 1, wherein the trailing edge section is translatable along the camber line relative to the leading edge section.

8. The assembly of claim 1, wherein the trailing edge section is pivotable about a second pivot axis relative to the leading edge section.

9. The assembly of claim 1, wherein the pivot axis is coplanar with the rotational axis.

10. The assembly of claim 1, wherein the pivot axis is non-coplanar with the rotational axis.

11. The assembly of claim 1, wherein the pivot axis is perpendicular to the rotational axis when viewed in a reference plane parallel with the rotational axis.

12. The assembly of claim 1, wherein the pivot axis is angularly offset from the rotational axis by an acute angle when viewed in a reference plane parallel with the rotational axis.

13. The assembly of claim 1, wherein
the open propulsor rotor includes a plurality of open propulsor blades arranged circumferentially about the rotational axis;
the plurality of open propulsor blades comprise a first open propulsor blade; and
the first open propulsor blade is configured to pivot and change a pitch of the first open propulsor blade.

14. The assembly of claim 1, further comprising:
a turbine engine core configured to drive rotation of the open propulsor rotor about the rotational axis;
the turbine engine core including a flowpath, a compressor section, a combustor section and a turbine section; and
the flowpath extending through the compressor section, the combustor section and the turbine section from an inlet into the flowpath to an exhaust from the flowpath.

15. An assembly for an aircraft propulsion system, comprising:
a propulsor rotor configured to rotate about a rotational axis, wherein the propulsor rotor is an open propulsor rotor; and
a guide vane structure axially next to and downstream of the propulsor rotor, the guide vane structure including a stationary structure and a plurality of guide vanes arranged circumferentially about the rotational axis, and the plurality of guide vanes comprising a first guide vane, wherein the guide vane structure is an open guide vane structure;
the first guide vane comprising a camber line, a leading edge, a trailing edge, a leading edge section and a trailing edge section, the first guide vane extending longitudinally along the camber line from the leading edge to the trailing edge, the leading edge section forming the leading edge and pivotally coupled to stationary structure, and the trailing edge section forming the trailing edge and movably coupled to the leading edge section, wherein the trailing edge section is coupled to the stationary structure through the leading edge section.

16. The assembly of claim 15, wherein
the leading edge section is configured to pivot about a pivot axis to change a pitch of the first guide vane; and
the trailing edge section is configured to move relative to the leading edge section to change a camber of the first guide vane.

17. The assembly of claim 15, wherein the trailing edge section is configured to translate relative to the leading edge section.

18. The assembly of claim 15, wherein the trailing edge section is configured to swing relative to the leading edge section.

19. An assembly for an aircraft propulsion system, comprising:
an open propulsor rotor configured to rotate about a rotational axis; and
an open guide vane structure axially next to and downstream of the open propulsor rotor, the open guide vane structure including a plurality of open guide vanes arranged circumferentially about the rotational axis, and the plurality of open guide vanes comprising a first open guide vane;
the first open guide vane comprising a camber line, a leading edge, a trailing edge, a leading edge section and a trailing edge section, the first guide vane extending longitudinally along the camber line from the leading edge to the trailing edge, the leading edge section forming the leading edge, the trailing edge section forming the trailing edge; and
the first open guide vane configured to move between a first arrangement and a second arrangement, a camber of the first open guide vane different when the first open guide vane is in the first arrangement than when the first open guide vane is in the second arrangement, and a pitch of the first open guide vane different when the first open guide vane is in the first arrangement than when the first open guide vane is in the second arrangement.

\* \* \* \* \*